US010140492B1

(12) United States Patent
Nair

(10) Patent No.: US 10,140,492 B1
(45) Date of Patent: Nov. 27, 2018

(54) METHODS AND SYSTEMS FOR VERIFYING AUTHENTICITY OF PRODUCTS

(71) Applicant: Ennoventure, Inc., Washington, DC (US)

(72) Inventor: Shalini Vanaja Nair, Thiruvananthapuram (IN)

(73) Assignee: Ennoventure, Inc., Washington, DC (US)

( * ) Notice: Subject to any disclaimer, the term of this patent is extended or adjusted under 35 U.S.C. 154(b) by 0 days.

(21) Appl. No.: 16/045,650

(22) Filed: Jul. 25, 2018

(51) Int. Cl.
*G06K 9/00* (2006.01)
*G06K 7/10* (2006.01)
*G06K 7/14* (2006.01)
*G06K 9/46* (2006.01)
*G06T 5/00* (2006.01)
*G06K 9/62* (2006.01)

(52) U.S. Cl.
CPC ..... *G06K 7/10861* (2013.01); *G06K 7/10386* (2013.01); *G06K 7/1413* (2013.01); *G06K 7/1482* (2013.01); *G06K 9/4652* (2013.01); *G06K 9/6215* (2013.01); *G06T 5/002* (2013.01); *G06T 5/005* (2013.01); *G06T 2207/20192* (2013.01)

(58) Field of Classification Search
None
See application file for complete search history.

(56) References Cited

U.S. PATENT DOCUMENTS

| 6,788,800 B1* | 9/2004 | Carr | G06Q 10/00 235/375 |
| 8,131,019 B2* | 3/2012 | Miller | G07B 17/00661 348/371 |
| 8,358,826 B1* | 1/2013 | Medina, III | G06Q 20/042 382/137 |
| 8,401,227 B2* | 3/2013 | Mitte | G03B 15/02 382/101 |

(Continued)

OTHER PUBLICATIONS

P. Premaratne and F. Safaei, "2D Barcodes as Watermarks in Image Authentication," 6th IEEE/ACIS International Conference on Computer and Information Science (ICIS 2007), Melbourne, Qld., 2007, pp. 432-437. doi: 10.1109/ICIS.2007.2.*

*Primary Examiner* — Tahmina Ansari
(74) *Attorney, Agent, or Firm* — Kanika Radhakrishnan; Evergreen Valley Law Group

(57) ABSTRACT

Embodiments provide methods and systems for verifying authenticity of products. In an embodiment, an image of at least a part of a product label of a product is scanned and processed. An image profile is created from the scanned image and compared with a set of reference image profiles. Each reference image profile is associated with a reference image, a reference control transform value and a reference validation transform value. If there is a matching between the image profile and one of the reference image profiles, the reference image corresponding to the matching reference image profile is retrieved. A control transform and a validation transform of the scanned image is determined. The control transform value and the validation transform value are compared with the reference control transform vale and (Continued)

the reference validation transform value of the reference image for verifying authenticity of the products, respectively.

20 Claims, 8 Drawing Sheets

(56) References Cited

U.S. PATENT DOCUMENTS

| | | | | |
|---|---|---|---|---|
| 8,910,274 | B2* | 12/2014 | Sanders | G06F 21/34 |
| | | | | 726/19 |
| 2008/0268934 | A1* | 10/2008 | Mattice | G07F 17/32 |
| | | | | 463/16 |
| 2010/0094794 | A1 | 4/2010 | Sridhar et al. | |
| 2013/0194414 | A1* | 8/2013 | Poirier | G06F 19/3462 |
| | | | | 348/92 |
| 2014/0315290 | A1 | 10/2014 | Mottahedeh | |
| 2015/0164399 | A1 | 6/2015 | Beg et al. | |
| 2016/0168521 | A1 | 6/2016 | Mottahedeh | |
| 2017/0344704 | A1 | 11/2017 | Chu | |

\* cited by examiner

METHODS AND SYSTEMS FOR VERIFYING AUTHENTICITY OF PRODUCTS

TECHNICAL FIELD

The present disclosure relates to authentication and, more particularly to, methods and systems for verifying authenticity of products.

BACKGROUND

With the advent of technology, there has been a tremendous change in purchasing trends of the consumers and sellers have expanded the market manifold to meet the demand of the consumers. However, some of the sellers have taken unfair advantage of the consumer purchasing trends to sell counterfeiting or fake products. Currently, most of the products sold via online stores or physical stores are counterfeit products and determining the authenticity of genuine products is crucial. In one example scenario, products manufactured by a producer may be distributed globally through a supply chain. The supply chain may include intermediaries, such as retailers, whole-sellers, authorized or non-authorized vendors, etc. In such a scenario, during a transit or storage, the products may be replicated by counterfeiters. As the products are globally distributed, there may be trading between one or more countries through parallel importing of the products. In such scenario, rate of counterfeiting of products may be high as products sold through parallel importing may lack consent of the actual producer. At present, counterfeit products have become one of the major issues encountered by both consumers and sellers. Such counterfeiting of products, for example, pharmaceutical items or edible products may cause life-threatening consequences. In addition, the consumer may not be provided with proper customer support from the producer due to lack of authenticity of the product purchased.

Conventionally, an identification code including, but not limited to, a barcode, a quick response (QR) code, etc. are printed on a product or packaging of the product to identify the origin of the product. For example, a barcode printed on a package of product includes information related to the product such as geographical location, ingredient lists, time of manufacture, etc. However, in some cases, some counterfeiters may replicate the barcode that may hinder the producers as well as the consumers. In some other scenarios, the counterfeiters may replicate an entire package of the product. The producers may face a huge monetary loss that may affect businesses and may even be detrimental to the goodwill and repute acquired by the producers during the course of business. The consumer may be deceived by counterfeiting products and may not trust producers which may result in the producer losing loyal customers. This may lead the consumer to look for a better producer in order to purchase genuine and authorized products even though the producers may be selling the genuine products at higher prices.

Generally, the identification code such as a barcode is identifiable using a device such as a barcode scanner. However, it may happen that such devices may not be feasible or accessible to the consumers for authenticating the product. For example, data that are encoded in the barcode may not be publicly available for verification by the consumers. It may also happen that the device may be expensive for use by the consumers.

In view of the above-mentioned problems there is a need for a technique where the consumers can verify the authenticity of products and thereby prevent purchasing of counterfeit products. The solution should further be capable of securing all parts of a product ranging from package such as carton, box, medicine strips, tube, bottle, cap to barcode, product label, aluminum foils, plastic wraps, etc.

SUMMARY

Various embodiments of the present disclosure provide methods and systems for verifying authenticity of products.

In an embodiment, a method is disclosed. The method includes accessing, by a processor, an image of at least a part of a product label associated with a product. The method includes extracting, by the processor, a plurality of image attributes from the image for creating an image profile of the image. The method includes comparing, by the processor, the image profile with a set of reference image profiles, each reference image profile for a reference image comprising a reference control transform value and a reference validation transform value of the reference image. The method includes upon comparing the image profile, by the processor, determining at least one reference image profile of the set of reference image profiles matching with the image profile. The method includes upon determining the at least one reference image profile, by the processor, determining a control transform value and a validation transform value of the image. The method further includes determining, by the processor, authenticity of the product label by comparing the control transform value and the validation transform value of the image with the reference control transform value and the reference validation transform value of the reference image, respectively.

In another embodiment, a server system is disclosed. The server system includes a memory comprising stored instructions and a processor. The processor is configured to execute the stored instructions. The processor is configured to cause the server system to perform at least in part to accessing an image of at least a part of a product label associated with a product. The server system is caused to perform extracting a plurality of image attributes from the image for creating an image profile of the image. The server system is caused to perform comparing the image profile with a set of reference image profiles, each reference image profile for a reference image comprising a reference control transform value, and a reference validation transform value of the reference image. The server system is caused to perform upon comparing the image profile determining at least one reference image profile of the set of reference image profiles matching with the image profile. The server system is further caused to perform determining a control transform value and a validation transform value of the image. The server system is caused to perform determining authenticity of the product label by comparing the control transform value and the validation transform value of the image with the reference control transform value and the reference validation transform value of the reference image, respectively.

In yet another embodiment, a method is disclosed. The method includes accessing, by a processor, an image of at least a part of a product label associated with a product. The method also includes extracting, by the processor, a plurality of image attributes from the image for creating an image profile of the image. The method includes comparing, by the processor, the image profile with a set of reference image profiles for determining a low-level authentication of the product label, each reference image profile for a reference image comprising a reference control transform value and a validation transform value. The method includes upon comparing the image profile, by the processor, determining at least one reference image profile of the set of reference image profiles matching with the image profile. The method includes determining, by the processor, a correlation value by performing a correlation between the image and at least one reference image associated with the at least one reference image profile. The method includes comparing, by the processor, the correlation value with a pre-defined threshold for determining an intermediate level of authentication of the product label, the intermediate level of authentication establishes a similarity between the image and the at least one reference image based on the pre-defined threshold. The method includes upon determining the similarity, by the processor, determining a control transform value and a validation transform value of the image. The method includes determining, by the processor, authenticity of the product label by comparing the control transform value and the validation transform value with the reference control transform value and the reference validation transform value, respectively, for determining a high-level authentication of the product label, the high-level authentication determines if the product label is authentic or counterfeit thereby establishing the authenticity of the product.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
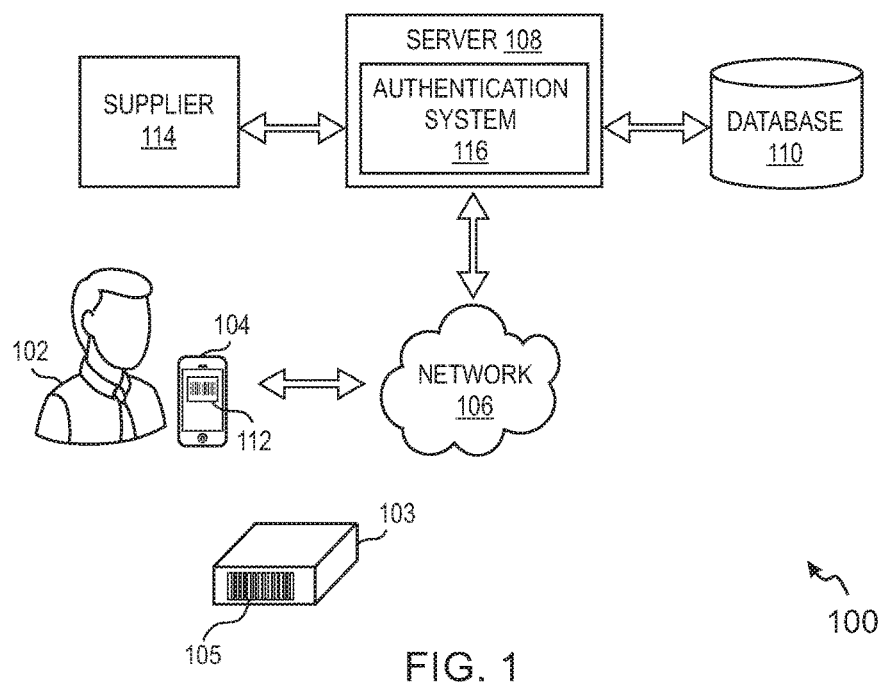
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for verifying authenticity of products.

In an embodiment, the user can verify an authenticity of a product using an electronic device, for example, a mobile device associated with the user. The user scans a product label associated with the product using camera module of the electronic device to obtain an image of at least a part of the product label. The product label includes one or more of barcode, serialization code and product information. The image of the product label is sent to an authentication system that facilitates the user in verifying the authenticity of the product. In at least one example embodiment, components of the authentication system may be hosted and managed by a server system (typically hosted in cloud, or optionally at a central location) associated with the supplier or the third party providing such services for verifying the authenticity of the products. The supplier may use the cloud in Software-as-as-Service model (SaaS) or Platform-as-a-Service (PaaS) model. In an example scenario, when the product label is scanned, noises (referred to hereinafter as 'distortions') may be introduced in the image (scanned image of the product label). The distortions may include a level of light falling on the image, an angle of scanning the product label, tears or creases on the product label, etc. The authentication system corrects such distortions by performing a pre-processing of the image. Pre-processing the image includes applying one or more image enhancement techniques on the image. For instance, when the product label is scanned, the image may not be straight, curvature may be not be proper, rotation may not be correct or edges on the barcode may not be clear. The image may be out-of-focus, blurred, bright or dim. The one or more enhancement techniques such as trained deep neural networks may correct the rotation of the image and fix the edges of the image.

After pre-processing the image, a plurality of image attributes is extracted for creating an image profile of the image. Some examples of the plurality of image attributes may includes one or more of chroma value, luminance value, brightness value, lightness value, hue saturation lightness, and hue saturation value associated with the image. It must be noted the plurality of image attributes may include more values than those mentioned as the examples. In one example embodiment, a specific image attribute for creating an image profile is selected from a pool of image attributes. The image attribute may be selected based on the image. For instance, luminance value may be used for creating the image profile of an image, and the chrominance value will be used for another image. In case of applying transforms such as a control transform and a validation transform on the image, different transforms may be selected according to the image. For instance, in an example, bilinear may be used for validation transform for the image. In another example, bi-octogonal may be used for a different image. Similarly, a different custom transform may be applied for another image. The authentication system is configured to compare the image profile with a set of reference image profiles. The set of reference image profiles may be stored in a database that is accessible by the authentication system. Each reference image profile for a reference image includes a reference control transform value and a reference validation transform value. After comparing the image profile with the set of image profiles, at least one reference image profile of the set of reference image profiles matching with the image profile is determined. After determining the at least one reference image profile, at least one reference image corresponding to the matching reference image profile is accessed.

The authenticity of the product label is determined by comparing the control transform value and the validation transform value of the scanned image (I) with the reference control transform value and reference validation transform value corresponding to the reference image (Ir). For example, a function is determined between the control transform value and the validation transform value of the image (I) and the reference control transform value and the reference validation transform value corresponding to the reference image (Ir), respectively. If the function is below a threshold, the product label (represented by the image) is authentic and if the function is above the threshold, the product label is a counterfeit thereby indicating a counterfeit product associated with the product label.

The process of verifying authenticity of an image of a product label associated with a product is further explained in detail with reference to FIGS. 1 to 7.

FIG. 1 illustrates an example representation of an environment 100, in which at least some example embodiments of the present disclosure can be implemented. The environment 100 includes a user 102 associated with an electronic device 104 capable of connecting to a communication network, such as a network 106. Some examples of the electronic device 104 may include laptops, smartphones, desktops, tablets, wearable devices, workstation terminals, and the like. The network 106 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

The user 102 may include, but not limited to, a consumer, a retailer, a distributor, anyone in supply chain, any authority checking authenticity in the shipping channel or anyone consuming a product from a supplier or a producer, such as a supplier 114. The supplier 114 may manufacture products and affix a product label for each product in a production batch or class of goods. In an example, the product label may include one or more of a barcode, a serialization code, a product information or any description code associated with the product.

The environment 100 is further depicted to include a server 108 and a database 110. In an example embodiment, the database 110 may be associated with the supplier 114 and is configured to store information related to products manufactured by the supplier 114. In another example embodiment, the database 110 may be maintained by a third-party for storing the information of the products manufactured by the supplier 114. The information may include a set of reference images that correspond to actual product labels affixed on the products manufactured by the supplier 114 or on any part of a package of the products including but not limited to tube, bottle, aluminum foil, or blister pack. Each reference image is associated with a reference image profile; a reference control transform value and a reference validation transform value. In one example, a product label associated with a product manufactured by the supplier 114 may be embedded with noise. The product label with embedded noise referred to hereinafter as a reference image is stored in the database 110. In one example embodiment, the reference image is associated with a reference control transform value and a validation transform value that are stored in the database 110. The database 110 is accessible only via the server 108 or may be disposed in a server associated with the supplier 114 so as to enable the server 108 to access the database 110.

In at least one example embodiment, the server 108 is configured to store an authentication application program 112 (referred to hereinafter as 'an application 112') and provision instances of the application 112 to the user 102 for verifying authenticity of any product. The instances of the application 112 may thereafter be downloaded on the electronic device 104 of the user 102 in response to their request for access to the application 112. It must be noted that the term 'application 112' is interchangeably referred to as 'application interface 112' throughout the disclosure.

In some embodiments, the server 108 may include an authentication system 116. The authentication system 116 may be used to verify authenticity of the product. As shown in FIG. 1, the authentication system 116 may be embodied in the server 108 or may be a standalone component. The authentication system 116 may provision authentication services as a Web service accessible through a Website. In such a scenario, the user 102 may access the Website over the network 106 using Web browser applications installed in the electronic device 104 and thereafter verify the authenticity of the product. In one example embodiment, the authentication system 116 may be hosted and managed by a cloud as a Software-as-as-Service model (SaaS) or in form of a Platform-as-a-Service (PaaS) model. The cloud may be associated with the supplier or the third party providing such services for verifying the authenticity of the products.

In an example scenario, the user 102 may purchase a product 103 from the supplier 114. When the user 102 receives the product 103, the user 102 can check authenticity of the product 103 by using the application 112. The user 102 captures an image by scanning a product label 105 associated with the product 103 using a camera module of the electronic device 104. The image is sent to the server 108 via the application 112 using an application programming interface (API) request. The server 108 receives the image and sends the image to the authentication system 116 for performing a validating authenticity of the image corresponding to the product label 105. The authentication system 116 verifies authenticity of the image corresponding to the product label 105 that enables in verifying authenticity of the product 103 purchased by the user 102.

The process of verifying the authenticity of the product label 105 by the authentication system 116 is explained with reference to FIG. 2.

Figure 2:
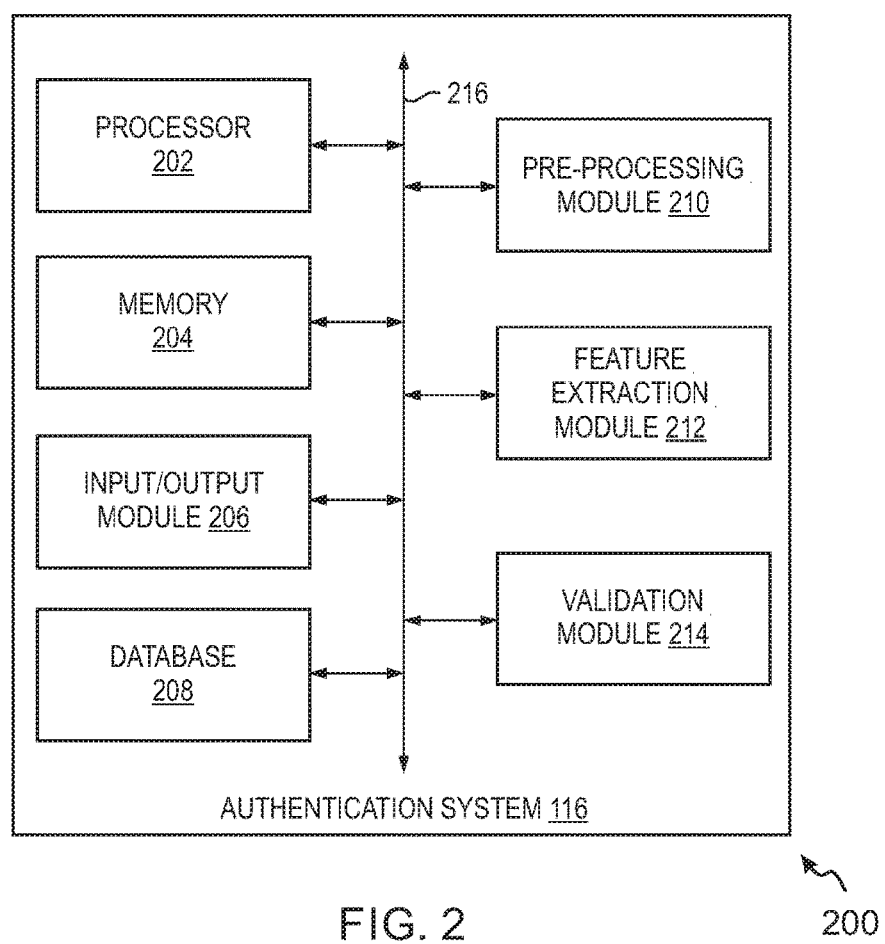
FIG. 2 shows a block diagram representation of an authentication system configured to verify authenticity of an image of a product label, in accordance with an example embodiment of the present disclosure.

Referring now to FIG. 2, a block diagram representation 200 of the authentication system 116 configured to verify authenticity of an image of a product label associated with a product is illustrated in accordance with an example embodiment of the present disclosure. In some embodiments, the authentication system 116 may be embodied in a server, such as, the server 108 described with reference to FIG. 1. In at least one example embodiment, the authentication system 116 may be embodied in an electronic device, such as, the electronic device 104 of FIG. 1. Moreover, the authentication system 116 may be a standalone system for verifying the authenticity of products. The authentication system 116 includes various processing modules for verifying the authenticity of the product label. The processing modules described herein may be implemented by combination of hardware and software.

The authentication system 116 is depicted to include a processor 202, a memory 204, an Input/Output module 206, a database 208, a pre-processing module 210, a feature extraction module 212 and a validation module 214. It is noted that although the authentication system 116 is depicted to include only one processor 202, the authentication system 116 may include more number of processors therein. Moreover, it shall be noted that the components are shown for exemplary purposes and the authentication system 116 may include fewer or more modules than those depicted in FIG. 2.

In an embodiment, the memory 204 is capable of storing machine executable instructions. Further, the processor 202 is capable of executing the machine executable instructions to determine authenticity of the product label of a product. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a graphical processing unit (GPU) or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

In an embodiment, the I/O module 206 may include mechanisms configured to receive inputs from and provide outputs to a user, such as the user 102 shown in FIG. 1. To that effect, the I/O module 206 may include at least one input interface and/or at least one output interface. The I/O module 206 accesses an image of the product label. In an example, the user 102 scans the product label and sends the image (scanned image of the product label) to the authentication system 116 via the application 112. The authenticity of the image is determined and a response indicating authenticity of the product is provided to the user 102 via the application 112. Examples of the input interface may include, but are not limited to, a keyboard, a mouse, a joystick, a keypad, a touch screen, soft keys, a microphone, and the like. Examples of the output interface may include, but are not limited to, a UI display such as User Interface (such as a light emitting diode display, a thin-film transistor (TFT) display, a liquid crystal display, an active-matrix organic light-emitting diode (AMOLED) display, etc.), a microphone, a speaker, a ringer, a vibrator, and the like.

The pre-processing module 210 removes distortions from the image by applying one or more image enhancement techniques on the image. The distortions may be induced when the image is scanned using an electronic device (e.g., the electronic device 104) of the user 102. The distortions may include, but not limited to, level of light falling on the product label, angle of capturing/scanning the product label, creases on the image, etc. The pre-processing module 210 may employ one or more image enhancement techniques that include machine learning mechanism like deep neural networks that may be used for correcting the image such as, rotation and fixing of edges on the image. In one example scenario, the product label may be scanned using a camera module (see, camera module 626) of an electronic device, such as the electronic device 104. The image of the product label may be slightly tilted towards right due to improper handling or changes in angle of the camera module and edges of the image may be blurry thereby introducing distortions in the image corresponding to the product label. The pre-processing module 210 may apply one or more filtering techniques, histogram equalization techniques, trained neural networks for de-noising the image or sampling techniques to enhance the image and to thereby remove distortions in the image.

The feature extraction module 212 is configured to extract a plurality of image attributes for creating an image profile of the image. The plurality of image attributes includes one or more of a chroma value, a luminance value, a brightness value, a hue saturation value, a hue saturation lightness value and a contrast sensitivity value. In one example, the image profile is created using a profiling method such as Just Noticeable Difference method (hereinafter referred to as 'JND method'). The image profile is created based on masking of pixel composition using the JND method. Examples of masking of pixel composition may include but not limited to contrast sensitivity masking, luminance masking and contrast masking.

The database 208 is configured to store a set of reference images. Each of the reference images corresponds to an original image of the product label with an embedded noise referred to hereinafter as modified image. Further, each of the reference image is associated with a reference image profile; a reference control transform value and a reference validation transform value. In one example, the reference control transform value and the reference validation transform value are obtained by performing a control transform and a validation transform on the original image and the modified image. For example, the control transform and the validation transform is applied on the reference image and the modified image of the product label for obtaining the reference control transform value and the reference validation transform value. The control transform (represented as T(1)) is selected such that when T(1) acts on original image ($\Sigma I(x,y)$) and the modified image ($\Sigma K(x,y)$), it generates the same output. Further, the validation transform (represented as T(2)) is selected such that when T(2) acts on the original image ($\Sigma I(x,y)$) and the modified image ($\Sigma K(x,y)$), it generates a constant delta.

The validation module 214 uses the plurality of image attributes for creating the image profile of the image. In one example, the image profile is created using a profiling method. For example, the image profile is created based on masking of pixel composition. Examples of masking of pixel composition may include, but are not limited to, contrast sensitivity masking, luminance masking and contrast masking. The image profile created may be compared with the set of reference image profiles stored in the database 208. For instance, the validation module 214 may determine a profile difference between one or more pixels of the image profile and corresponding one or more pixels of each reference image profile of the set of reference image profiles. For example, if the image profile (P1) is compared with set of reference image profiles (S1, S2, S3, S4), the profile difference may be D1 when the image profile I1 is compared with reference image profile S1, a profile difference D2 on comparing the image profile I1 with reference image profile S2, a profile difference D3 on comparing the image profile I1 with the reference image profile S3 and a profile difference D4 on comparing the image profile I1 with the reference image profile S4. In at least one example embodiment, the validation module 214 determines at least one reference image profile of the set of reference image profiles matching with the image profile when the profile difference is less than a profile threshold (TP). For example, assuming profile difference D1 as 0.8, D2 as 0.002, D3 as 0.6 and D4 as 0.4 and the profile threshold (TP) as 0.1, the profile difference D2 of the reference image profile S2 is below the profile threshold (TP) thereby indicating that the reference image profile S2 closely matches the image profile I1.

In one example scenario, when the image profile matches with the at least one reference image profile (e.g., reference image profile S2), a low-level authenticity of the product label is confirmed. For example, the low-level authentication indicates that the image of the product label may match with the reference image corresponding to the reference image profile S2. After confirming the low-level authenticity, the validation module 214 determines a correlation value between the image and the at least one reference image associated with the at least one reference image profile (e.g., a reference image E1 associated with the reference image profile S2). In one example, a correlation operation is performed between the image and the at least one reference image for determining the correlation value. Determining correlation between the image and the at least one reference image enables establishing an intermediate-level of authentication of the product label. The correlation value helps in understanding a similarity between the image and the at least one reference image. The correlation value is compared with a pre-defined threshold. If the correlation value is above the pre-defined threshold, then similarity is established between the image and the at least one reference image. In one example, the scanned image is processed using a trained Neural Network which contains all permutations and combinations of the reference image. The trained Neural Network helps in optimizing identification process of the image against the at least one reference image.

Furthermore, the validation module 214 determines a control transform value and a validation transform value of the image scanned by the user. The control transform value and the validation transform value of the image are determined by applying a control transform and a validation transform on the image and the at least one reference image. The control transform value and the validation transform value of the image are compared with a reference control transform value and a reference validation value of the at least one reference image. In at least one example embodiment, comparing the control transform value includes checking whether the control transform value for the scanned image and the reference control transform value for the reference image are same. In at least one example embodiment, comparing the validation transform value includes determining a function between the validation transform value of the scanned image and the reference validation transform value, and if the function is below a threshold then the scanned image of product label is authentic. The function enables the validation module 214 to establish a high-level of authentication of the product label (represented by the image). In an example embodiment, if the function (H1=fn(T1)) is lesser than a threshold (Th), the product label is genuine thereby indicating that the product may be genuine and when the function (H1=fn(T1)) is greater than the threshold (Th), the product label is a counterfeit indicating that the product may also be a counterfeit that is not provided by the supplier (e.g., the supplier 114).

The various modules of the authentication system 116, such as the processor 202, the memory 204, the I/O module 206, the database 208, the preprocessing module 210, the feature extraction module 212 and the validation module 214 may be configured to communicate with each other through a centralized circuit system 216. The centralized circuit system 216 may be various devices configured to, among other things, provide or enable communication between the components (202-214) of the authentication system 116. In certain embodiments, the centralized circuit system 216 may be a central printed circuit board (PCB) such as a motherboard, a main board, a system board, or a logic board. The centralized circuit system 216 may also, or alternatively, include other printed circuit assemblies (PCAs) or communication channel media. In some embodiments, the centralized circuit system 216 may include appropriate storage interfaces to facilitate communication between the processor 202 and the memory 204. Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 202 with access to the data stored in the memory 204.

Figure 3:
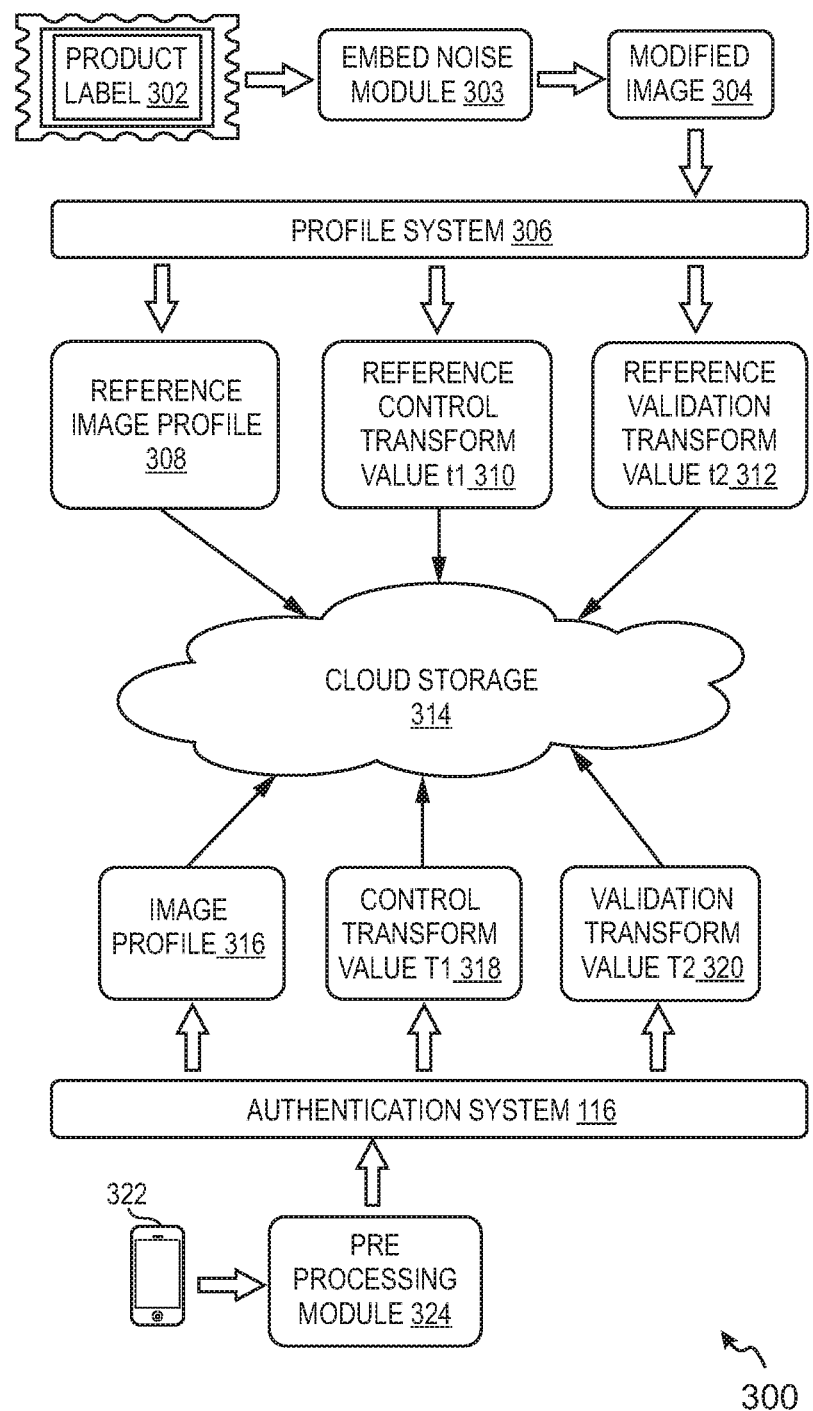
FIG. 3 illustrates an exemplary representation for verifying authenticity of an image of a product label, in accordance with an example embodiment of the present disclosure.

FIG. 3 illustrates an exemplary representation 300 for verifying authenticity of an image of a product label 302 associated with a product, in accordance with an example embodiment of the present disclosure. It must be noted that the barcode 402 has been shown for example purposes only and the authentication of an image of the product may include any such authentication performed on at least an image portion corresponding to a package, a label, tube, carton, bottle, plastic wrap or a blister pack.

In one example, a supplier, such as the supplier 114 described with reference to FIG. 1 may provide an identification code corresponding to products of the supplier 114. The identification code may be attached to a product label, such as a product label 302. The product label 302 is added with noise by a noise embedding module 303 for generating a modified image 304. The product label 302 is accessed as an image referred to hereinafter as a reference image. The noise embedding module 303 provides a noise generation method that generates a series of functions represented as $f(x, y, \ldots)$, $f(x+\Delta x, y \ldots)$ for creating distortions. The distortions are added as the noise to the reference image represented as $\Sigma I(x, y)$ for generating the modified image represented as $\Sigma K(x, y)$.

The reference image 302 and the modified image 304 are sent to a profile system 306. The profile system 306 runs three profiling methods for generating a reference image profile 308, a reference control transform value 310 and a reference validation transform value 312. The reference image profile 308 is created by using a plurality of image attributes, such as, including but not limited to, HSV, HSL, chroma value, luminance value, etc. The reference control transform value (t1) 310 is obtained by applying a control transform on the reference image 302 and the modified image 303. The control transform value (t1) 310 provides same output that acts as a control. The reference validation transform value (t2) 312 is obtained by applying a validation transform on the reference image 302 and the modified image 304. The validation transform value (t2) 312 provides a constant delta value. The reference image profile 308, the reference control transform value (t1) 310 and the reference validation transform value (t2) 312 are stored in a cloud storage 314 for reference. The cloud storage 314 may be associated with the supplier 102 or may be controlled by a server, such as the server 108 described with reference to FIG. 1.

The reference image 302 is printed and attached as a product label to a product. In one example scenario, a user (e.g., the user 102 described in FIG. 1) may purchase a product with a product label, such as the product label 302. In one scenario, the product label may include embedded noise, such as the noise 304. The user can check if the product purchased is authentic or counterfeit with the help of an authentication system, such as the authentication system 116 as described with reference to FIGS. 1 and 2. The product label is scanned by using an electronic device 322 associated with the user. The scanned product label referred to hereinafter as a scanned image is pre-processed and de-noised by a pre-processing module 324. The pre-processing module 324 is an example of the pre-processing module 210 described with reference to FIG. 2. In one example, the pre-processing module 324 de-noises and pre-processes the scanned image by using rotation corrections, chroma corrections and noise elimination methods. For example, the pre-processing module 324 removes distortions from the image by applying one or more image enhancement techniques on the image. For instance, the scanned image may not align straight or edges may be unclear. In such a case, the pre-processing module 322 applies the one or more image enhancement techniques for correcting rotation and fixing of edges on the image.

The pre-processed image referred to hereinafter as the image is sent to the authentication system and processes the image for checking authenticity of the product purchased. The authentication system 116 creates an image profile 316, generates a control transform value (T1) 318 and a validation transform value (T2) 320 of the image. In one example embodiment, the creation of image profile 316 and generation of the control transform value (T1) 318 and the validation transform value (T2) 320 are performed in parallel manner. In another example embodiment, the creation of image profile 316 and generation of the control transform value (T1) 318 and the validation transform value (T2) 320 can be performed in sequential manner. The authentication system 116 creates the image profile 316 by using a plurality of image attributes extracted from the image. Some examples of the plurality of image attributes include but are not limited to one or more of a chroma value, a luminance value, a brightness value, a hue saturation value, a hue saturation lightness value and a contrast sensitivity value.

The image profile 316 is compared with a set of reference image profiles for determining at least one reference image profile, such as a reference image profile 308 that matches with the image profile 316. The set of reference image profiles are already stored in the cloud storage 314. Each reference image profile has a reference image comprising a reference control transform value (t1) 310 and a reference validation transform value (t2) 312. In one example, the reference image profile 308 is selected based on a profile difference associated with each of the reference image profiles of the set of reference image profiles.

The authentication system 116 accesses the reference image corresponding to the reference image profile 308 from the cloud storage 314. The control transform value (T1) 318 and the validation transform value (T2) 320 are compared with the reference control transform value (t1) and the reference validation transform value (t2) that are stored in the cloud storage 314. If the control transform value (T1) and the validation transform value (T2) match with the reference control transform value (t1) and the reference validation transform value (t2), then authenticity of the product label 302 is determined that helps in confirming that the product purchased is authentic.

In an example embodiment, an application interface may cause display of one or more UIs for: 1) capturing an image of a product label, and 2) displaying authenticity of the product label (represented by the image) to a user, such as the user 102 (shown in FIG. 1). Example UIs displayed to the user 102 for scanning the image of the product label and displaying the authenticity of the image are described with reference to FIGS. 4A to 4B.

Figure 4A:
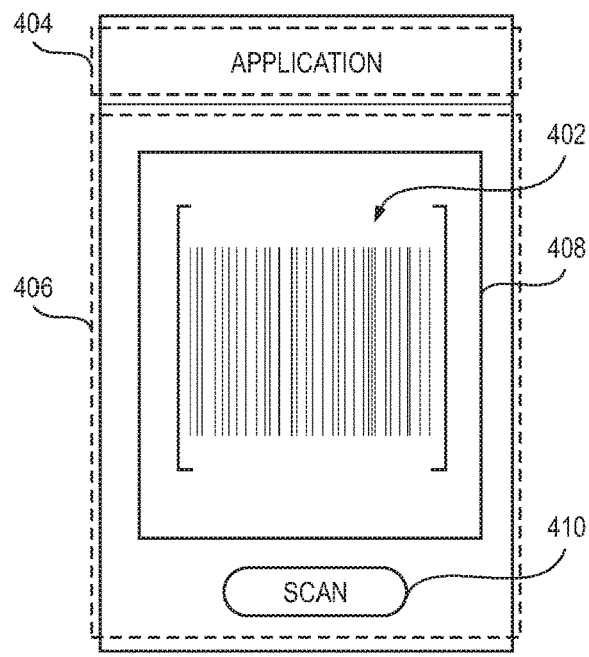
FIG. 4A illustrates an example representation of a UI depicting scanning of an image of a product label, such as, a barcode using an electronic device, in accordance with an example embodiment of the present disclosure.

FIG. 4A illustrates an example representation of a UI 400 depicting scanning of a product label, such as a barcode 402 using an electronic device (e.g., the electronic device 104) via the application interface 112, in accordance with an example embodiment of the present disclosure. It must be noted that the barcode 402 has been shown for example purposes only and the authentication of an image of the product may include any such authentication performed on at least an image portion corresponding to a package, a label or a blister pack. In an example scenario, the application interface 112 may be downloaded to an electronic device (e.g., the electronic device 104 in FIG. 1) from a server (e.g., the server 108 in FIG. 1). An application icon may be displayed to the user 102 on the display screen of the electronic device 104. The application icon is not shown in FIG. 4A. Upon invoking the application interface 112, the UI 400 may provide options for the user 102 to scan the barcode 402. In an embodiment, the user 102 can capture the image of the product label using a camera module of the electronic device and send the image to the server 108 for verifying authenticity of the product label (represented by the image).

The UI 400 is depicted to include a header portion 404 and a content portion 406. The header portion 404 is depicted to exemplarily display a title associated with text "APPLICATION" indicating name of the application interface 112. As seen from FIG. 4A, the content portion 406 depicts a camera guidance overlay 408 that enables the user to adjust angle of capture of the camera module. The content portion 406 includes a scan tab 410 below the camera guidance overlay 408 for scanning the barcode 402. When the user 102 clicks the scan tab 410, the barcode 402 is scanned. In at least one example embodiment, the barcode 402 is stored as an image in an internal memory of the electronic device 104. The electronic device 104 is configured to send the image of the barcode 402 to the authentication system 116 residing in a server, such as the server 108 via the application interface 112. In an example, an application programming interface (API) request is sent to the authentication system 116 for verifying the barcode 402. In at least one example embodiment, the user may use services of other applications for sending the image of the barcode 402 to the authentication system 116. The authentication system 116 is configured to verify authenticity of the barcode 402. When the image of the barcode 402 is verified, a page displaying the authenticity of the barcode 402 is displayed as shown in FIG. 4B.

Figure 4B:
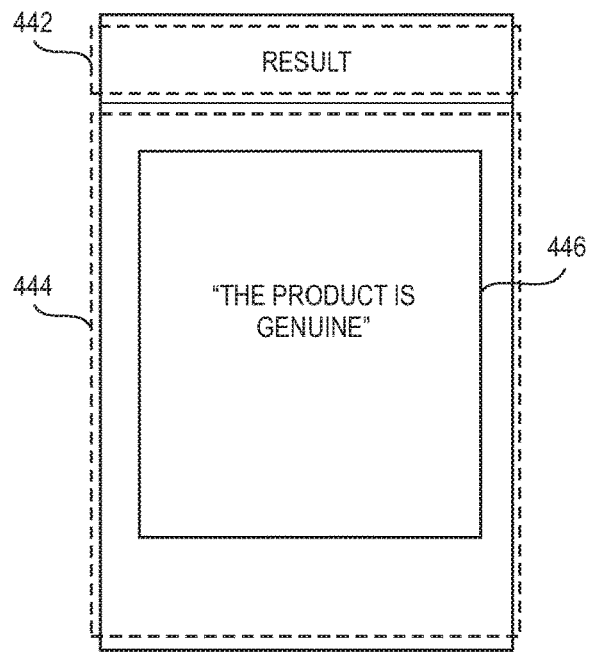
FIG. 4B illustrates an example representation of a UI displaying authenticity of the barcode, in accordance with an example embodiment of the present disclosure.

FIG. 4B illustrates an example representation of a UI 440 displaying authenticity of the barcode 402 on the application interface 112, in accordance with an example embodiment of the present disclosure.

The UI 440 includes a header portion 442 and a content portion 444. The header portion 442 includes a title associated with text 'RESULT'. It shall be noted that the title may be associated with any other label/text other than the text depicted here.

The content portion 444 includes a content box 446 displaying a result indicating authenticity of the barcode 402 (shown in FIG. 4A). The content box 446 is depicted to include a message 'THE PRODUCT IS GENUINE' indicating that the product label is authentic. The message has been shown for representation purpose only and the content box may display any text indicating genuine/counterfeit product label.

Figure 5A:
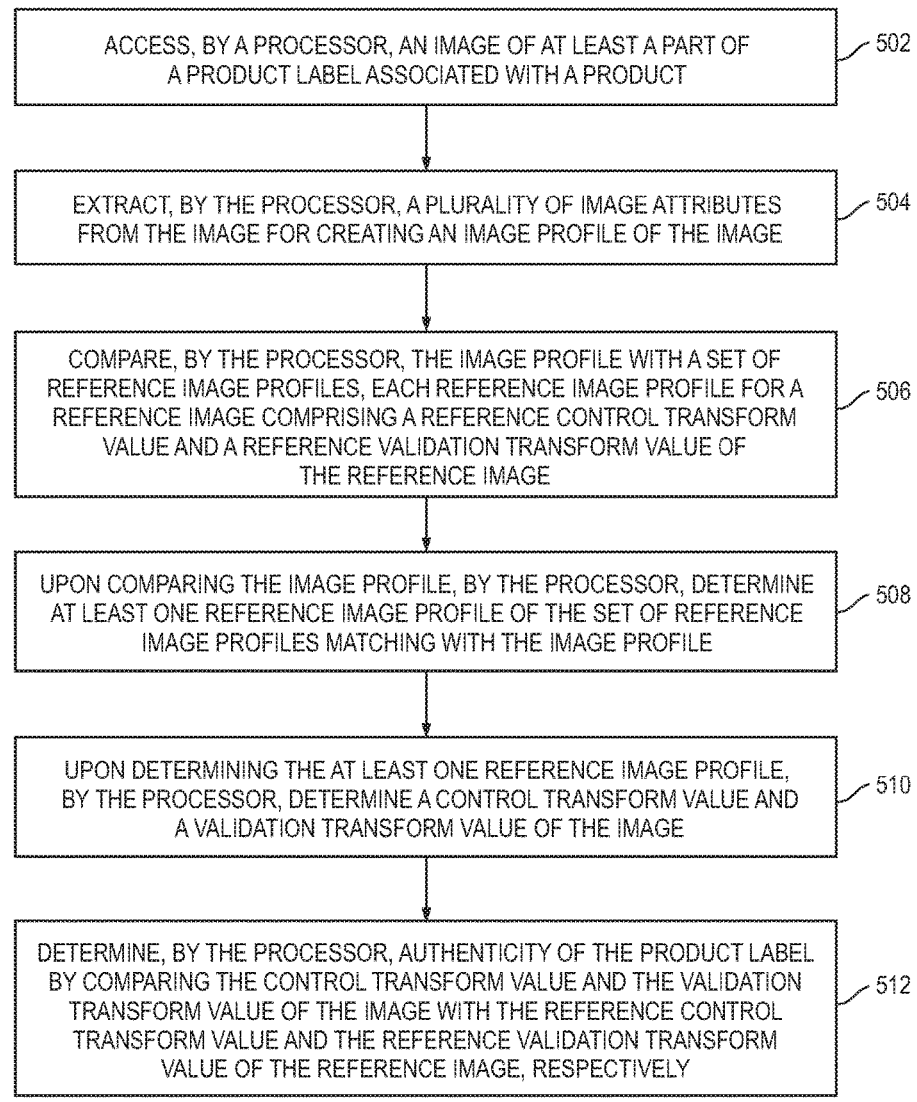
FIG. 5A illustrates a flow diagram depicting a method for verifying authenticity of a product, in accordance with an example embodiment of the present disclosure.

FIG. 5A illustrates a flow diagram depicting a method 500 for verifying authenticity of a product label of a product, in accordance with an example embodiment of the present disclosure. The method 500 depicted in the flow diagram may be executed by, for example, the server 108 or the authentication system 116. Operations of the method 500 and combinations of operation in the flow diagram, may be implemented by, for example, hardware, firmware, a processor, circuitry and/or a different device associated with the execution of software that includes one or more computer program instructions. The method 500 starts at operation 502.

At operation 502, the method 500 includes accessing, by a processor, an image of at least a part of a product label associated with a product. The product label may include one or more of barcode, serialization code and product information. In one example scenario, when a user, such as the user 102 purchases a product, the user can check authenticity of the product by verifying authenticity of the product label. The image is scanned by using a camera module of an electronic device, such as the electronic device 104 (shown in FIG. 1). An application programming interface (API) request is sent to an authentication system, such as the authentication system 116 for verifying the authenticity of the product label. In an embodiment, the product label is scanned to acquire an image corresponding to the product label. In some example embodiments, the image of the product label is captured using a camera module of the electronic device 104. In at least one example embodiment, the image of the product label is accessed from a storage interface of the electronic device. The image may include at least a portion of a blister pack, a plastic wrap, a bottle, a tube, a carton, a packaging corresponding to a product. In an example scenario, when the product label is scanned by the electronic device 104, distortions may be introduced in the image. Such distortions can be removed by pre-processing the image. The pre-processing of the image includes applying one or more image enhancement techniques on the image using trained neural networks. The one or more image enhancement techniques on the image may include rotating the image and fixing edges of the image.

At operation 504, the method 500 includes extracting, by the processor, a plurality of image attributes from the image for creating an image profile of the image. The plurality of image attributes includes one or more of a chroma value, a luminance value, a brightness value, a lightness value, a hue saturation lightness, and a hue saturation value associated with the image. In one example, the image profile is created using a JND method. The image profile may be created based on contrast sensitivity, luminance and contrast masking of a pixel composition of the image such as to assist in image recognition. In one embodiment, the image profile of the image may be created by using deep learning.

At operation 506, the method 500 includes comparing, by the processor, the image profile with a set of reference image profiles. Each reference image profile for a reference image comprises a reference control transform value and a reference validation transform value of the reference image. The set of reference image profiles, the reference control transform value and the reference validation transform value are stored in a database, such as the database 110 (shown in FIG. 1). In one example, a profile difference between one or more pixels of the image profile and corresponding one or more pixels of each reference image profile is determined by comparing the image profile with each of the reference image profiles.

At operation 508, the method 500 includes upon comparing the image profile, by the processor, determining at least one reference image profile of the set of reference image profiles matching with the image profile. The at least one reference image profile is selected based on the profile difference associated with each of the reference image profiles of the set of reference image profiles. In one example, determining the at least one reference image profile matching with the image profile helps in confirming a low-level authenticity of the product. For instance, the low-level authenticity indicates that information of the product label associated with the image exists in the database 110 and thereby denotes that the image of the product label may be associated with a product offered by a supplier, (e.g., the supplier 114).

At operation 510, the method includes upon determining the at least one reference image profile, by the processor, determining a control transform value and a validation transform value of the image. In one example, an authentication system, such as the authentication system 116 described with reference to FIGS. 1 and 2 applies a control transform and a validation transform on the image and the reference image. The control transform value (T1) provides same output that acts as a control. The validation transform value (T2) provides a constant delta value.

At operation 512, the method includes determining, by the processor, authenticity of the product label by comparing the control transform value and the validation transform value of the image (i.e. the scanned image) with corresponding reference control transform value and the reference validation transform value of the reference image. The authentication system 116 checks if control transform value is same as the reference control transform value. In an embodiment, the control transform for the scanned image and the control transform for the reference image (as stored in Cloud) should be same for authenticity of the scanned image. Further, a function between the validation transform value and the reference validation transform value is determined. If the function is below a threshold, the product label of the product is determined to be authentic/genuine and thereby indicating that the product is also authentic. If the difference exceeds the threshold, the product label is not authentic and indicates that the product to be a counterfeit product. The determination of the function and comparing against the threshold ensures a high level authentication of the product label for determining if the product label is authentic or counterfeit and thereby establishing authenticity of the product.

It shall be noted that one or more operations of the method 500 may be grouped together and performed in form of a single step, or one operation may have several sub-steps that may be performed in parallel or in sequential manner.

Figure 5B:
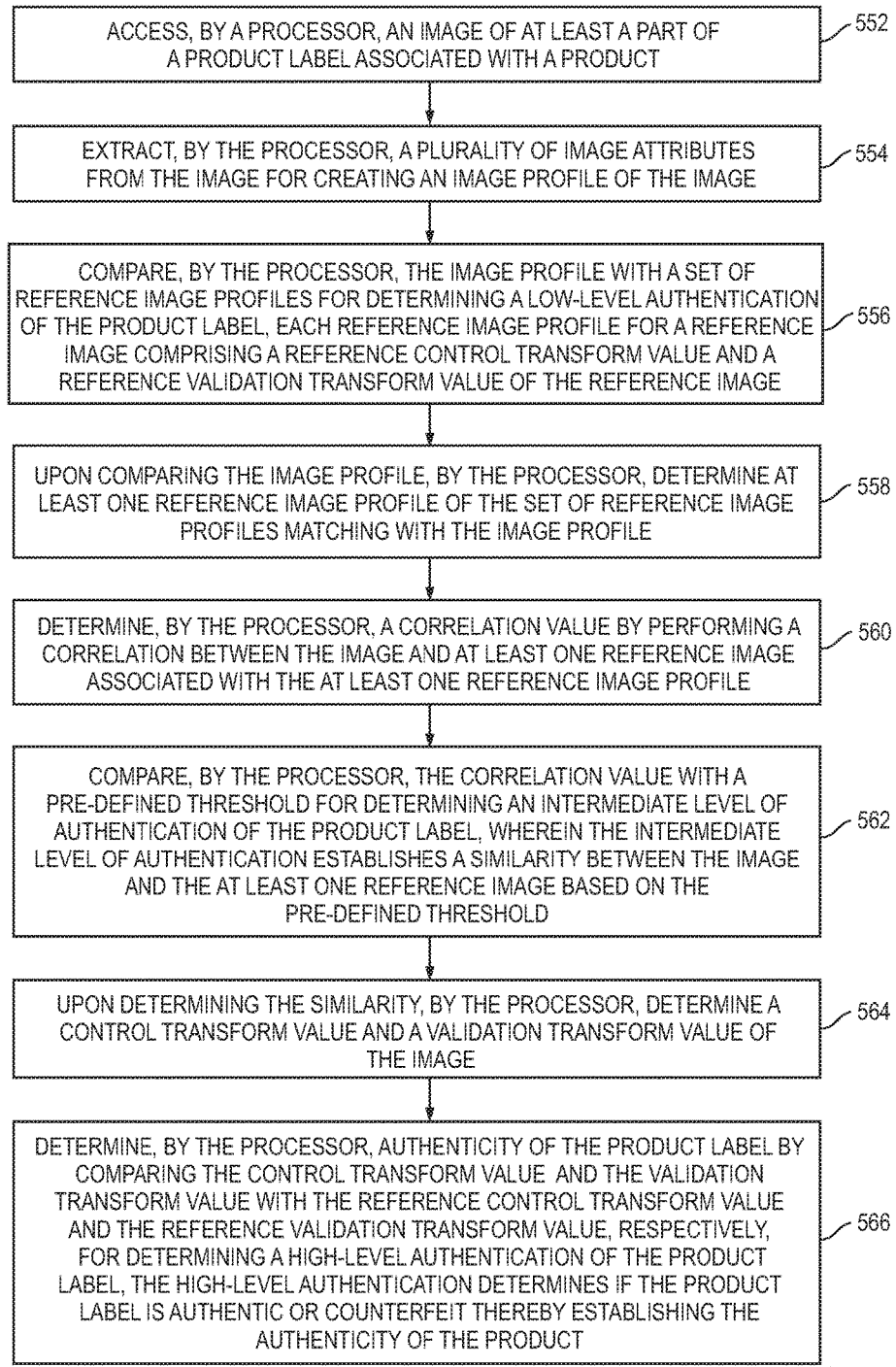
FIG. 5B illustrates a flow diagram depicting a method for verifying authenticity of a product, in accordance with another example embodiment of the present disclosure.

FIG. 5B illustrates a flow diagram depicting a method 550 for verifying authenticity of a product, in accordance with another example embodiment of the present disclosure. The method 550 depicted in the flow diagram may be executed by, for example, the server 108 or the authentication system 116. Operations of the method 550 and combinations of operation in the flow diagram, may be implemented by, for example, hardware, firmware, a processor, circuitry and/or a different device associated with the execution of software that includes one or more computer program instructions. The method 550 starts at operation 552.

At operation 552, the method 550 includes accessing, by a processor, an image of at least a part of a product label associated with a product.

At operation 554, the method 550 includes extracting, by the processor, a plurality of image attributes from the image for creating an image profile of the image.

At operation 556, the method 550 includes comparing, by the processor, the image profile with a set of reference image profiles for determining a low-level authentication of the product label. Each reference image profile for a reference image comprises a reference control transform value and a validation transform value. In one example, a profile difference between one or more pixels of the image profile and corresponding one or more pixels of each reference image profile is determined by comparing the image profile with each of the reference image profiles.

At operation 558, the method 550 includes upon comparing the image profile, by the processor, determining at least one reference image profile of the set of reference image profiles matching with the image profile. In one example, the at least one reference image profile is selected based on a profile difference when the profile difference is below a profile threshold. In an example, image profile (I1) is compared with reference image profiles (G1, G2, G3) and the profile differences are 0.1, 0.5 and 0.03. If the profile threshold is 0.2, the reference image profiles G1 and G3 are selected and are deemed to match with the image profile (I1). The determination of at least one reference image profile (e.g., G1, G3) matching with the image profile (I1) establishes a low-level authentication (or affirmation) that the product label (represented by the image) may be authentic subsequent to an intermediate-level authentication and high-level authentication.

At operation 560, the method 550 includes determining, by the processor, a correlation value by performing a correlation between the image and at least one reference image associated with the at least one reference image profile. In one example, the correlation value may be obtained by performing a correlation, such as a cross-correlation between the image and the at least one reference image.

At operation 562, the method 550 includes comparing, by the processor, the correlation value with a pre-defined threshold for determining an intermediate level of authentication of the product label. The intermediate level of authentication establishes if the image is similar to the at least one reference image based on the pre-defined threshold. When the correlation value is above the pre-defined threshold, the image is similar to the at least one reference image. In one example embodiment, comparing the correlation values include using Deep Neural Networks to learn from different possible combinations of scanned image to match the scanned image to appropriate image to our reference image.

At operation 564, the method 550 includes upon determining the similarity, by the processor, determining a control transform value and a validation transform value of the image.

At operation 566, the method 550 includes determining, by the processor, authenticity of the product label by comparing the control transform value and the validation transform value with the reference control transform value and the reference validation transform value, respectively, for determining a high-level authentication of the product label. The high-level authentication determines if the product label is authentic or counterfeit based on such comparisons, thereby establishing the authenticity of the product. In an example embodiment, a function is determined between the validation transform value of the image and the reference validation transform value corresponding to the reference image. If the function is below a threshold (Th), and the control transform values of the scanned image and the reference image are same, the product label (represented by the image) is authentic thereby establishing that the product associated with the product label may be authentic. When the function is above the threshold (Th), the product label (represented by the image) is counterfeit (or not authentic) thereby indicating that the product associated with the product label may be a counterfeit.

Figure 6:
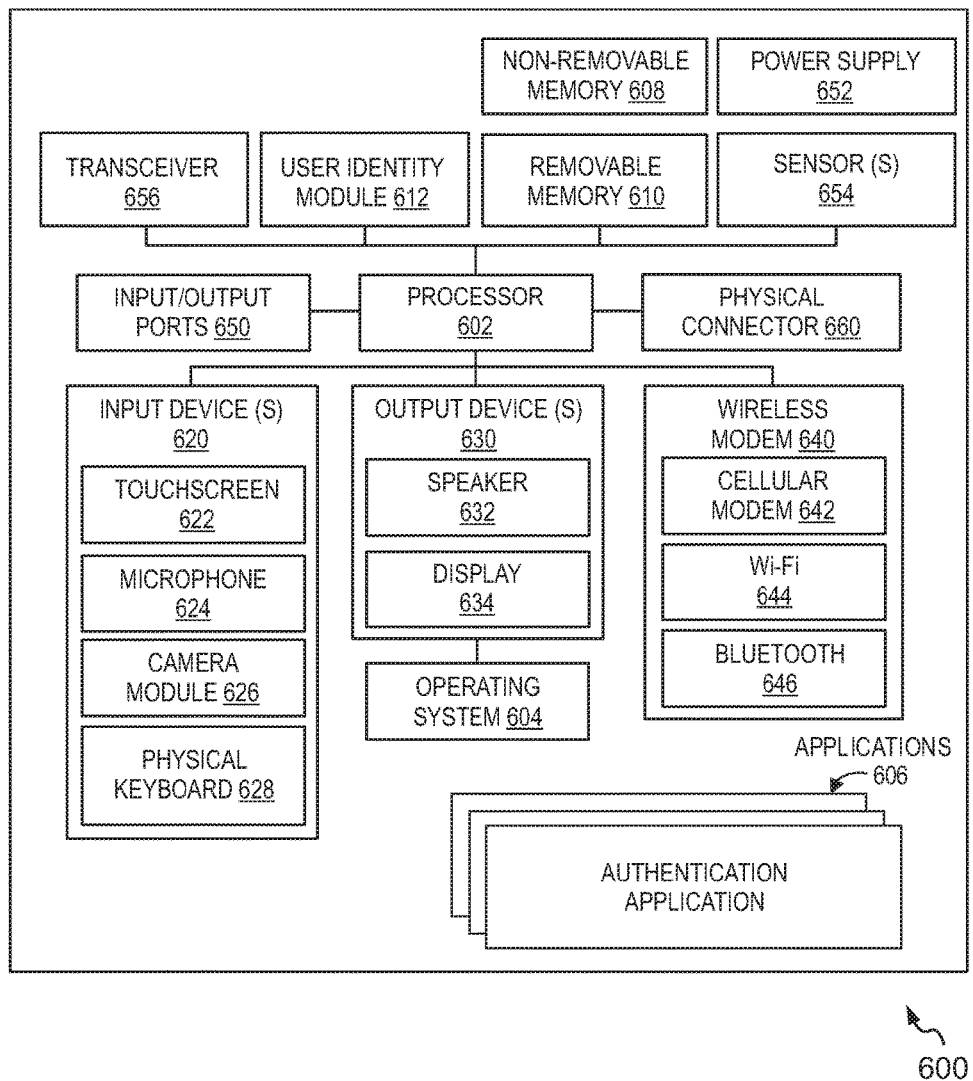
FIG. 6 shows simplified block diagram of an electronic device capable of implementing the various embodiments of the present disclosure.

FIG. 6 illustrates an electronic device 600 capable of implementing the various embodiments of the present invention. The electronic device 600 is an example of the electronic device 104 described with reference to FIG. 1.

It should be understood that the electronic device 600 as illustrated and hereinafter described is merely illustrative of one type of device and should not be taken to limit the scope of the embodiments. As such, it should be appreciated that at least some of the components described below in connection with that the electronic device 600 may be optional and thus in an example embodiment may include more, less or different components than those described in connection with the example embodiment of the FIG. 6. As such, among other examples, the electronic device 600 could be any of a mobile device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 600 includes a controller or a processor 602 (e.g., a signal processor, microprocessor, ASIC, or other control and processing logic circuitry) for performing such tasks as signal coding, data processing, image processing, input/output processing, power control, and/or other functions. An operating system 604 controls the allocation and usage of the components of the electronic device 600 and support for one or more applications programs (see, applications 606), such as an application interface for capturing an image of a product label and determining authenticity of the image of the product label. In addition to the application interface, the applications 606 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 600 includes one or more memory components, for example, a non-removable memory 608 and/or a removable memory 610. The non-removable memory 608 and/or the removable memory 610 may be collectively known as database in an embodiment. The non-removable memory 608 can include RAM, ROM, flash memory, a hard disk, or other well-known memory storage technologies. The removable memory 610 can include flash memory, smart cards, or a Subscriber Identity Module (SIM). The one or more memory components can be used for storing data and/or code for running the operating system 604 and the applications 606. The electronic device 600 may further include a user identity module (UIM) 612. The UIM 612 may be a memory device having a processor built in. The UIM 612 may include, for example, a subscriber identity module (SIM), a universal integrated circuit card (UICC), a universal subscriber identity module (USIM), a removable user identity module (R-UIM), or any other smart card. The UIM 612 typically stores information elements related to a mobile subscriber. The UIM 612 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 600 can support one or more input devices 620 and one or more output devices 630. Examples of the input devices 620 may include, but are not limited to, a touch screen/a screen 622 (e.g., capable of capturing finger tap inputs, finger gesture inputs, multi-finger tap inputs, multi-finger gesture inputs, or keystroke inputs from a virtual keyboard or keypad), a microphone 624 (e.g., capable of capturing voice input), a camera module 626 (e.g., capable of capturing still picture images and/or video images) and a physical keyboard 628. Examples of the output devices 630 may include, but are not limited to a speaker 632 and a display 634. Other possible output devices can include piezoelectric or other haptic output devices. Some devices can serve more than one input/output function. For example, the touch screen 622 and the display 634 can be combined into a single input/output device.

A wireless modem 640 can be coupled to one or more antennas (not shown in FIG. 6) and can support two-way communications between the processor 602 and external devices, as is well understood in the art. The wireless modem 640 is shown generically and can include, for example, a cellular modem 642 for communicating at long range with the mobile communication network, a Wi-Fi compatible modem 644 for communicating at short range with an external Bluetooth-equipped device or a local wireless data network or router, and/or a Bluetooth-compatible modem 646. The wireless modem 640 is typically configured for communication with one or more cellular networks, such as a GSM network for data and voice communications within a single cellular network, between cellular networks, or between the electronic device 600 and a public switched telephone network (PSTN).

The electronic device 600 can further include one or more input/output ports 650 for scanning the image, sending the image to an authentication system (e.g., the authentication system 116) and receiving authenticity of the image from the server 108, a power supply 652, one or more sensors 654 for example, an accelerometer, a gyroscope, a compass, or an infrared proximity sensor for detecting the orientation or motion of the electronic device 600 and biometric sensors for scanning biometric identity of an authorized user, a transceiver 656 (for wirelessly transmitting analog or digital signals) and/or a physical connector 660, which can be a USB port, IEEE 1294 (FireWire) port, and/or RS-232 port. The illustrated components are not required or all-inclusive, as any of the components shown can be deleted and other components can be added.

With the application (see, the applications 606) and/or other software or hardware components, the electronic device 600 can perform at least: cause provisioning of one or more UIs for capturing the image of the product label associated with the product and displaying authenticity of the product label of the product. In some embodiments, the authentication system 116 for determining authenticity of the image of the product label may be embodied in the electronic device 600.

Figure 7:
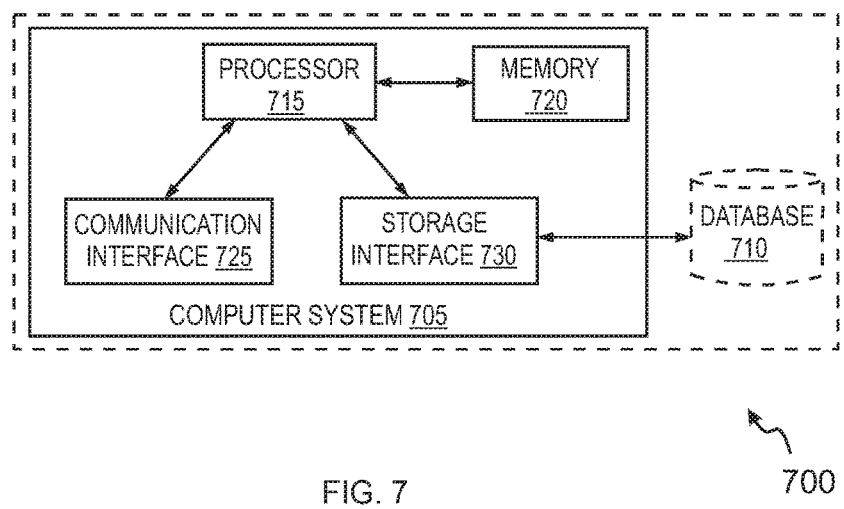
FIG. 7 illustrates a block diagram representation of a server capable of implementing at least some embodiments of the present disclosure.

FIG. 7 illustrates a block diagram representation of a server 700 capable of implementing at least some embodiments of the present disclosure. The server 700 is configured to host and manage the application interface 112 that is provided to an electronic device such as the electronic device 104, in accordance with an example embodiment of the invention. An example of the server 700 is the server 108 shown and described with reference to FIG. 1. The server 700 includes a computer system 705 and a database 710.

The computer system 705 includes at least one processor 715 for executing instructions. Instructions may be stored in, for example, but not limited to, a memory 720. The processor 715 may include one or more processing units (e.g., in a multi-core configuration).

The processor 715 is operatively coupled to a communication interface 725 such that the computer system 705 is capable of communicating with a mobile device, for example, the electronic device 104 or communicates with any entity within the network 106 via the communication interface 725. For example, the communication interface 725 may access the image from the electronic device 104.

The processor 715 may also be operatively coupled to the database 710. The database 710 is any computer-operated hardware suitable for storing and/or retrieving data, such as, but not limited to, a plurality of reference images of a plurality of product labels, barcodes of products, image profiles corresponding to the plurality of reference images of the plurality of product labels and one or more transform values for one or more image regions of each of the reference image stored in the database 710. The database 710 may include multiple storage units such as hard disks and/or solid-state disks in a redundant array of inexpensive disks (RAID) configuration. The database 710 may include a storage area network (SAN) and/or a network attached storage (NAS) system.

In some embodiments, the database 710 is integrated within the computer system 705. For example, the computer system 705 may include one or more hard disk drives as the database 710. In other embodiments, the database 710 is external to the computer system 705 and may be accessed by the computer system 705 using a storage interface 730. The storage interface 730 is any component capable of providing the processor 715 with access to the database 710. The storage interface 730 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 715 with access to the database 710.

The processor 715 is further configured to receive the image of the product label from the user for validating and verifying authenticity of the product. The processor 715 is further configured to perform: extract a plurality of image attributes from the image for creating an image profile of the image, and compare the image profile with a set of reference image profiles in the database 710. In one example embodiment, deep learning may be used to train neural networks to identify the image against a reference image. The processor 715 is further configured to determine at least one reference image profile upon comparing the image profile with the set of reference image profiles for determining a low-level authentication of the image, determine a correlation value between the image and at least one reference image associated with the at least one reference image profile, and determine an intermediate level of authentication based on the correlation value. The processor 715 is further configured to determine a control transform value and a validation transform value of the image, and determine authenticity of the product label by comparing the control transform value and the validation transform value with a reference control transform value and a reference validation transform value corresponding to the reference image for determining a function and establish if the product label is genuine or counterfeit.

The disclosed methods with reference to FIGS. 1 to 7, or one or more operations of the flow diagram 500 or 550 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method, comprising:
accessing, by a processor, an image of at least a part of a product label associated with a product;
extracting, by the processor, a plurality of image attributes from the image for creating an image profile of the image;
comparing, by the processor, the image profile with a set of reference image profiles, each reference image profile for a reference image comprising a reference control transform value and a reference validation transform value of the reference image;
upon comparing the image profile, by the processor, determining at least one reference image profile of the set of reference image profiles matching with the image profile;
upon determining the at least one reference image profile, by the processor, determining a control transform value and a validation transform value of the image; and
determining, by the processor, authenticity of the product label by comparing the control transform value and the validation transform value of the image with the reference control transform value and the reference validation transform value of the reference image, respectively.

2. The method as claimed in claim 1, further comprising:
determining, by the processor, a similarity between the image and the reference image associated with the at least one reference image profile prior to determining the control transform value and the validation transform value.

3. The method as claimed in claim 2, wherein determining the similarity comprises:
determining, by the processor, a correlation value by performing a correlation between the image and the reference image; and
determining, by the processor, the image to be similar to the reference image if the correlation value is above a pre-defined threshold.

4. The method as claimed in claim 1, further comprising:
performing, by the processor, a pre-processing of the image for removing distortions from the image.

5. The method as claimed in claim 4, wherein performing the pre-processing comprises:
applying one or more image enhancement techniques on the image, the one or more image enhancement techniques comprising techniques for correcting rotation and fixing edges of the image using deep neural networks.

6. The method as claimed in claim 1, wherein the product label comprises one or more of:
a barcode;
a serialization code; and
a product information.

7. The method as claimed in claim 1, wherein the plurality of image attributes comprises one or more of:
a chroma value;
a luminance value;
a brightness value;
a lightness value;
a hue saturation lightness; and
a hue saturation value associated with the image.

8. The method as claimed in claim 1, wherein comparing the image profile comprises:
determining, by the processor, a profile difference between one or more pixels of the image profile and corresponding one or more pixels for each reference image profile.

9. The method as claimed in claim 1, wherein comparing the control transform value and the validation transform value of the image comprises:
checking, the processor, the control transform value of the image and the reference control transform value of the reference image are same;
upon checking the control transform value and the reference control transform value being same, determining, by the processor, a function between the validation transform value of the image and the reference validation transform value.

10. The method as claimed in claim 9, further comprising determining, by the processor, the image of the product label as authentic if the function is below a threshold.

11. A server system, comprising:
a memory comprising stored instructions; and
a processor configured to execute the stored instructions to cause the server system to perform at least in part to:
accessing an image of at least a part of a product label associated with a product;
extracting a plurality of image attributes from the image for creating an image profile of the image;
comparing the image profile with a set of reference image profiles, each reference image profile for a reference image comprising a reference control transform value and a reference validation transform value of the reference image;
upon comparing the image profile, determining at least one reference image profile of the set of reference image profiles matching with the image profile;
upon determining the at least one reference image profile, determining a control transform value and a validation transform value of the image; and
determining authenticity of the product label by comparing the control transform value and the validation transform value of the image with the reference control transform value and the reference validation transform value of the reference image, respectively.

12. The server system as claimed in claim 11, wherein the server system is further caused at least in part to perform:
determining a similarity between the image and at least one reference image associated with the at least one reference image profile prior to determining the control transform value and the validation transform value.

13. The server system as claimed in claim 12, wherein for determining the similarity the server system is further caused at least in part to perform:
determining a correlation value by performing a correlation between the image and the at least one reference image; and
determining the image to be similar to the at least one reference image if the correlation value is above a pre-defined threshold.

14. The server system as claimed in claim 11, wherein the server system is further caused at least in part to perform a pre-processing of the image for removing distortions from the image.

15. The server system as claimed in claim 14, wherein for performing the pre-processing the server system is further caused at least in part to perform applying one or more image enhancement techniques on the image, the one or more image enhancement techniques comprising techniques for correcting rotation and fixing edges of the image.

16. The server system as claimed in claim 11, wherein the plurality of image attributes comprises one or more of:
a chroma value;
a luminance value;
a brightness value;
a lightness value;
a hue saturation lightness; and
a hue saturation value associated with the image.

17. The server system as claimed in claim 11, wherein for comparing the image profile the server system is further caused at least in part to determine a profile difference between one or more pixels of the image profile and corresponding one or more pixels for each reference image profile.

18. A method, comprising:
accessing, by a processor, an image of at least a part of a product label associated with a product;
extracting, by the processor, a plurality of image attributes from the image for creating an image profile of the image;
comparing, by the processor, the image profile with a set of reference image profiles for determining a low-level authentication of the product label, each reference image profile for a reference image comprising a reference control transform value and a reference validation transform value of the reference image;
upon comparing the image profile, by the processor, determining at least one reference image profile of the set of reference image profiles matching with the image profile;
determining, by the processor, a correlation value by performing a correlation between the image and at least one reference image associated with the at least one reference image profile;
comparing, by the processor, the correlation value with a pre-defined threshold for determining an intermediate level of authentication of the product label, wherein the intermediate level of authentication establishes a similarity between the image and the at least one reference image based on the pre-defined threshold;

upon determining the similarity, by the processor, determining a control transform value and a validation transform value of the image; and determining, by the processor, authenticity of the product label by comparing the control transform value and the validation transform value with the reference control transform value and the reference validation transform value, respectively, for determining a high-level authentication of the product label, the high-level authentication determines if the product label is authentic or counterfeit thereby establishing the authenticity of the product.

19. The method as claimed in claim 18, wherein comparing the control transform value and the validation transform value comprises:

checking, the processor, the control transform value of the image and the reference control transform value of the reference image are same; and upon checking the control transform value and the reference control transform value being same, determining, by the processor, a function between the validation transform value of the image and the reference validation transform value.

20. The method as claimed in claim 19, further comprising determining, by the processor, the image of the product label as authentic if the function is below a threshold.

* * * * *